July 28, 1964   J. B. FELDERMANN   3,142,310
COUPLING STRUCTURE FOR A FLOAT-VALVE ASSEMBLY
Filed Aug. 31, 1962   2 Sheets-Sheet 1
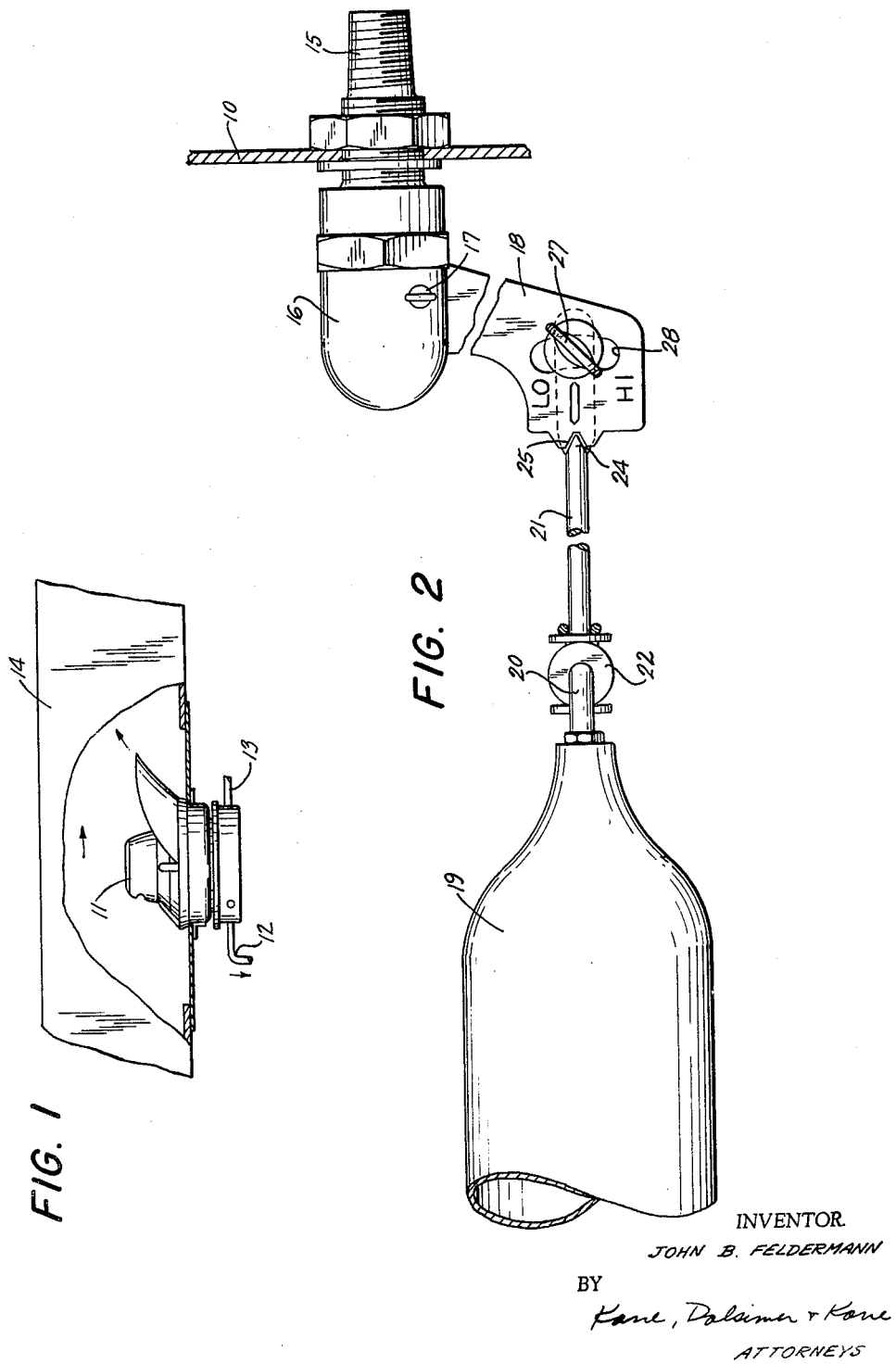
INVENTOR.
JOHN B. FELDERMANN
BY
Kane, Dalsimer & Kane
ATTORNEYS

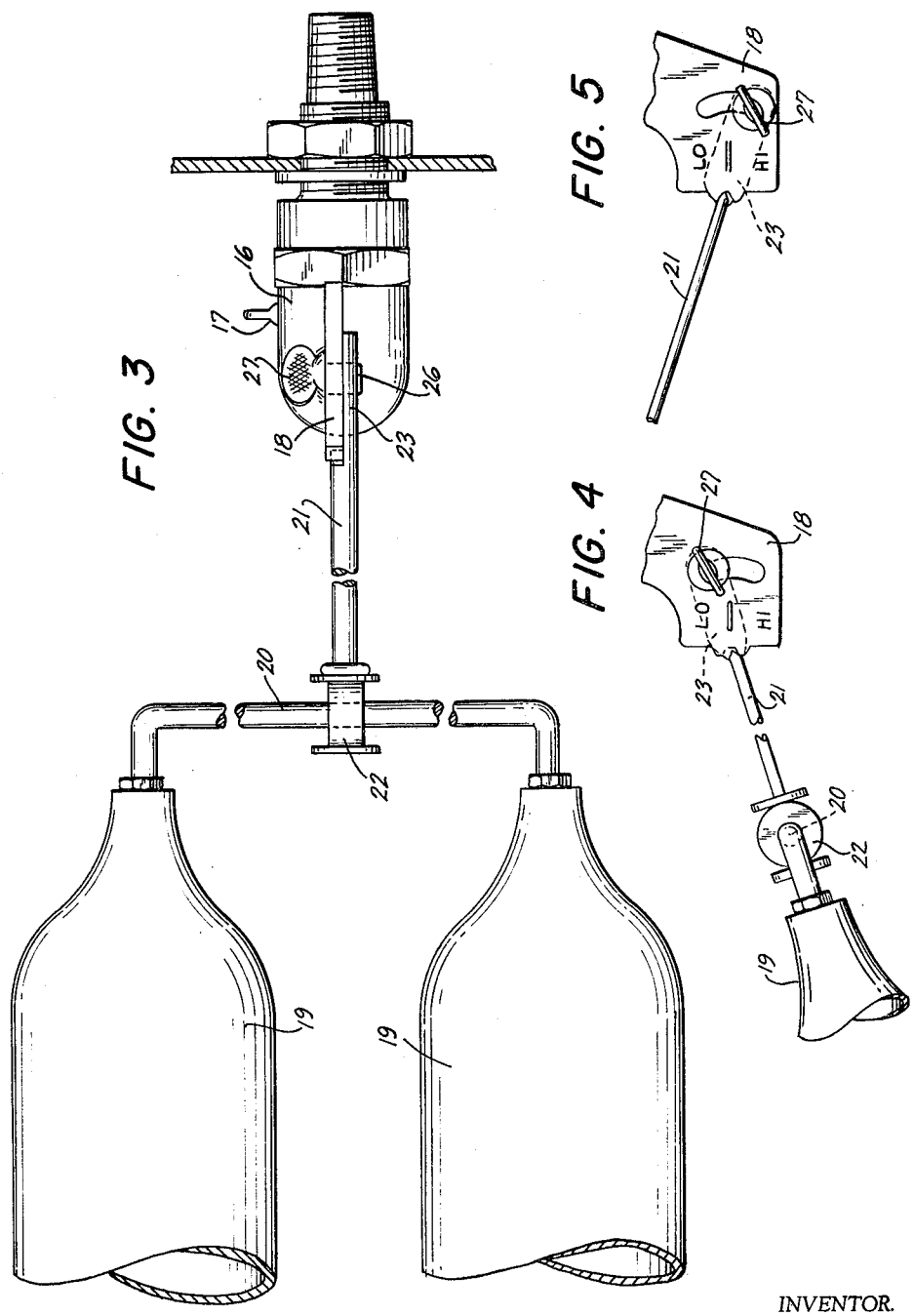

3,142,310
COUPLING STRUCTURE FOR A FLOAT-VALVE
ASSEMBLY
John B. Feldermann, Livingston, N.J., assignor to Walton Laboratories, Inc., Irvington, N.J., a corporation of New Jersey
Filed Aug. 31, 1962, Ser. No. 220,705
3 Claims. (Cl. 137—434)

This invention relates to a structurally and functionally improved coupling structure for a float-valve assembly and especially an assembly associated with a humidifier structure in which the level of water is to be maintained at a certain depth.

It is a primary object of the invention to furnish a structure of this nature which may readily be associated with the pan of a humidifier apparatus or other mechanism in which a desired liquid level is to be maintained and which structure will permit of ready adjustment of the parts so that in any given installation the desired relationship may be readily established.

A further object is that of designing a coupling which will embody relatively few parts, each individually simple and rugged in construction; those parts being readily susceptible to association with a liquid-utilizing mechanism and operating over long periods of time with freedom from all difficulties.

With these and other objects in mind reference is had to the attached sheets of drawings illustrating one practical embodiment of the invention and in which:

FIG. 1 is a side elevation of a humidifier apparatus with which the coupling is associated;

FIG. 2 is a side elevation of the coupling connecting the float and valve assembly associated with this or equivalent apparatus;

FIG. 3 is a bottom plan view of the assembly;

FIG. 4 is a fragmentary side elevation of the parts providing the coupling structure and showing them in one position, and FIG. 5 is a view similar to FIG. 4 but showing the parts in a different position.

Referring primarily to FIG. 1, there has been illustrated an arrangement of apparatus in which a float-valve assembly would be present. A coupling structure as herein contemplated would be ideally desirable for an installation of this type. However, the coupling structure might be employed to advantage in many other types of installation where it is desirable or necessary that a predetermined liquid level be maintained.

Thus, the numeral 10 indicates the base or pan of a humidifier mechanism which will include the usual motor driven water elevating and distributing structure to assure of the creation of a desired aerosol. The motor will conveniently be housed within a cover 11. Moisture-laden air will be discharged from the mechanism in any desired manner. An overflow pipe 12 conveniently connects with the interior of pan 10. Likewise, a water supplying pipe 13 connects with that pan. The mechanism may be mounted to extend within a duct 14 within which an air flow occurs. In that event it will ordinarily not be necessary to include a blower or fan unit as part of the humidifier apparatus. However, it will be apparent that some desirable form of water-level maintaining mechanism will be necessary and, that is, as a precautionary measure, an overflow pipe such as 12 be provided.

A float-valve assembly and coupling structure as herein contemplated are shown in FIGS. 2 and 4 in which the numeral 15 indicates a fitting for coupling with the water supply line 13. This fitting connects at its inner end with a valve encasing member 16. An actuator for the valve mechanism is pivotally secured as at 17 to the casing 16 and extends beyond the latter preferably in the form of a plate 18. As will be appreciated, the valve mechanism within casing 16 may take one of numerous different forms. It will be connected to the actuator 18 in accordance with conventional technique so that as that actuator is moved in a clockwise direction (FIGS. 2, 4 and 5) a flow of liquid through fitting 15 will be interrupted. When the actuator shifts around its pivot 17 in a counter clockwise direction then liquid will flow from pipe 13 and be discharged into pan 10 or its equivalent through an opening (not shown) in or adjacent to casing 16.

The float structure of the present assembly will preferably embrace a pair of hollow float members 19 preferably formed of metal and rigidly connected to each other by a bar 20. That bar is connected to an arm 21 for rotation around the axis of the latter by a hub 22. Accordingly, with the floats 19 resting within a body of liquid one will not be immersed to a greater extent than the other even if arm 21 does not extend through a plane perpendicular to the surface of the liquid. In other words, a leveling structure is automatically provided such that the floats may assume a condition under equal buoyancy within the liquid and thus compensate for varying installation conditions.

The coupling structure between the float or floats and the valve assembly should be capable of ready adjustment to provide for the maintenance of different liquid levels within the reservoir or pan of the mechanism with which it is associated. This is achieved in the present instance by providing a pivotal connection between arm 21 and actuator 18 so that desired annular relationships between these parts may be established. Thereafter the parts are locked against relative movements so that arm 21 and actuator 18 move as a unit.

A simple form of connection within the scope of the present teachings is provided by having the arm flattened as indicated at 23 in FIG. 3 and extend in face-to-face contact with plate 18. Adjacent the end of the flattened surface the arm is provided with a preferably V-shaped portion or protrusion 24. Adjacent this the edge of plate 18 is provided with a notch 25. Accordingly, a fulcrum coupling is furnished such that arm 21 may rock with respect to actuator 18. To lock the arm in this position a clamping member is employed in the form of a threaded bolt or member 26 mounting a winged nut 27. The bolt is mounted adjacent the end of flattened portion 23 and extends through an opening 28 formed in the actuator or plate 18.

It is apparent with a structure such as the foregoing no difficulty will be experienced in associating it with a mechanism such as a vacuum cleaner. Thereupon, the latter may be properly mounted with fitting 15 coupled to a supply pipe 13 and an overflow pipe 12 preferably connected to the pan or reservoir and discharging at a suitable location. Under these circumstances, the pan will receive liquid and the floats 19 will rise to a desired level with both of them immersed to a substantially equal extent in the body of liquid.

Under these circumstances, the water supply through pipe 13 may be interrupted and the humidifier or equivalent mechanism operated under varying depth conditions to determine the depth of liquid most suitable for efficient functioning. In such determination water may be added or taken away from the pan.

Once having established the proper depth the operator will adjust the relationship of arm 21 to actuator 18 so that with the floats in proper position the mechanism of the valve assembly will be closed. Thereupon, he will tighten the clamp provided by the bolts 26 and wing nut 27 or equivalent structure. With such tightening the nut will frictionally bear against the face of the plate 18. It will draw the flattened end portion 23 of arm 21 into tight engagement with the adjacent surface of the plate or actuator. In such adjustment the fulcrum provided at 24-25 will allow of a ready rocking arm 21 with respect to the actuator so that the "cut-off" point of the valve mechanism will be exactly in accord with the depth level which should be maintained.

Thus, among others, the several objects of the invention as aforenoted are achieved. Obviously, numerous changes in construction and rearrangements of the parts may be resorted to without departing from the spirit of the invention as defined by the claims.

I claim:

1. In an assembly including a valve, a valve actuator and a float member the provision of a connection between said valve actuator and said float member comprising a flat surface of said valve actuator, an opening formed in said actuator, a rod connected at one end to said float member, a flattened upper surface of said rod adjacent said flat surface, a notch formed in said actuator, a protrusion of said rod within said notch, clamping means extending through said opening and maintaining said flat surface and said flattened upper surface in a position free of relative movement, and said opening being elongated whereby said clamping means can maintain said flat surface and said flattened surface in one of a plurality of positions.

2. An assembly in accordance with claim 1 in which said clamping means consists of a thread bolt received in a threaded insert of said flattened upper surface and an enlarged nut with said actuator disposed between said nut and said rod and said nut tightened to maintain said flat surface and said flattened upper surface in close adjacency.

3. An assembly in accordance with claim 2 in which the lower end of said rod is pivotally connected to said float.

References Cited in the file of this patent
UNITED STATES PATENTS

| | | |
|---|---|---|
| 430,224 | Anderson | June 17, 1890 |
| 502,191 | Hodgson | July 25, 1893 |
| 1,164,538 | Madden | Dec. 14, 1915 |
| 1,188,535 | Ellis | June 27, 1916 |
| 3,004,748 | Sprouse et al. | Oct. 17, 1961 |